(12) United States Patent
Pulek et al.

(10) Patent No.: US 6,524,411 B2
(45) Date of Patent: Feb. 25, 2003

(54) METHOD OF APPLYING AN END-CAP TO A PLEATED FILTER ELEMENT

(75) Inventors: John L. Pulek, Cheshire, CT (US); Daniel Marcinczyk, Meriden, CT (US)

(73) Assignee: CUNO Incorporated, Meriden, CT (US)

( * ) Notice: Subject to any disclaimer, the term of this patent is extended or adjusted under 35 U.S.C. 154(b) by 150 days.

(21) Appl. No.: 09/774,332

(22) Filed: Jan. 31, 2001

(65) Prior Publication Data

US 2001/0010297 A1 Aug. 2, 2001

Related U.S. Application Data

(63) Continuation of application No. 09/145,933, filed on Sep. 3, 1998, now abandoned.
(60) Provisional application No. 60/058,201, filed on Sep. 8, 1997.

(51) Int. Cl.[7] .................................................. B65B 7/28
(52) U.S. Cl. ........................ 156/69; 156/293; 156/303.1
(58) Field of Search ....................... 156/69, 293, 303.1, 156/330; 210/493.1, 493.2, 493.5

(56) References Cited

U.S. PATENT DOCUMENTS

| | | | |
|---|---|---|---|
| 2,957,235 A | 10/1960 | Steinberg | |
| 4,392,958 A | 7/1983 | Ganzi et al. | |
| 4,512,892 A | 4/1985 | Ganzi et al. | |
| 4,769,096 A | 9/1988 | Vander Giessen et al. | |
| 4,890,444 A | 1/1990 | Vander Giessen et al. | |
| 5,024,870 A | 6/1991 | Jackson | |
| 5,130,023 A | * 7/1992 | Feint | 210/493.2 |
| 5,174,896 A | 12/1992 | Harms, II | |
| 5,350,515 A | 9/1994 | Stark et al. | |
| 5,399,264 A | * 3/1995 | Pulek et al. | 210/450 |
| 5,472,537 A | * 12/1995 | Friel et al. | 156/69 |
| 5,536,290 A | * 7/1996 | Stark et al. | 55/498 |
| 5,556,440 A | * 9/1996 | Mullins | 55/498 |
| 5,647,950 A | 7/1997 | Reed et al. | |
| 5,660,608 A | 8/1997 | Bartholome | |
| 5,984,109 A | * 11/1999 | Kanwar | 210/440 |

FOREIGN PATENT DOCUMENTS

BE  757 121  3/1971

* cited by examiner

*Primary Examiner*—Michael W. Ball
*Assistant Examiner*—Todd J. Kilkenny
(74) *Attorney, Agent, or Firm*—Cummings & Lockwood

(57) ABSTRACT

A filter element comprising at least one elastomeric end-cap, a thin-walled pleated filter medium having edges thereon constructed and arranged for positioning proximate to the elastomeric end-caps, and a polymeric adhesive material within the end-caps for sealing the edges of the filter media therein, and a method for producing the same.

4 Claims, 2 Drawing Sheets

METHOD OF APPLYING AN END-CAP TO A PLEATED FILTER ELEMENT

REFERENCE TO RELATED APPLICATION

This is a continuation of application Ser. No. 09/145,933, filed Sep. 3, 1998, now abandoned. This application claims priority from U.S. Patent Provisional No. 60/058,201 filed Sep. 8, 1997, which is herein incorporated in its entirety by reference.

BACKGROUND OF THE INVENTION

1. Field of the Invention

The present invention generally relates to an improved end-cap for pleated filter cartridges and a method of manufacturing such end-capped pleated filter cartridge. More particularly, the present invention relates to a pleated surface-type filter cartridge having an elastomeric end-cap which acts both as the end-cap for sealing the filter element and a gasket for providing a seal between the filter housing and the filter cartridge. The elastomeric end-cap of such pleated surface-type filter cartridge is bound to the filter element by means of a thermoset or thermoplastic adhesive.

2. Background of the Related Art

Filtration is the process of separating particles from a fluid suspension (liquid or gas) by use of a porous medium or by means of a medium possessing chemical properties, such as hydrophobicity, electrostatic charge, etc., which permit such medium to interact and hold the particles which are to be separated from the fluid while permitting the fluid to pass there through. In conventional filtration, the filter medium retains most of the suspended particles which are filtered on or within itself, but allows the fluid being filtered to pass through unimpeded. Flow across the filter medium is generally achieved by the application of a driving force, usually in the form of a static pressure difference across the filter, which may be generated, for example by external pressure applied upstream, a vacuum applied downstream, gravity, or other force. Fluid suspension separations are used extensively in the manufacture of polymer products, medicinals, mineral and metallurgical processing, petroleum refining, water purification, emissions control, and in beverage and food preparation.

Most conventional filters may be categorized into two broad categories of filters, surface-type filters and depth-type filters. In surface-type filters, particles larger than the pore size of the filter medium are stopped at the upstream surface of the filter. Solids form a filter cake on the surface of the filter medium, the cake itself forming a filter which clogs with time. In depth filtration, on the other hand, the filters are constructed of medium of sufficient thickness, relative to contaminant size, to filter throughout the full depth. Typically the filter medium has a distribution of pore sizes some greater than the particles to be removed, so that the particles can penetrate into the medium. The particles are mainly retained in the medium by means of direct interceptions and by adsorptive surface forces (molecular and electrostatic).

Filters are often fabricated into cartridges comprising filter media surrounding a tubular support and/or drainage core. Depth-type filtration cartridges are frequently fabricated from wound material, felts, some porous ceramics, sintered metal or metal fibers and bonded fibers. Surface-type filtration cartridges are frequently fabricated of fiber sheets. Surface-type filter cartridges may be resin impregnated paper, may be membranous, may comprise porous metal, plastic, or non-woven material and may be covered with a netting or cage to increase strength.

Generally as a fluid suspension is passed across filter media the pressure drop across the filter gradually increases. Such increase is generally due to collection of material on the filter media. An increasing pressure drop across the filter media translates into an increasing load on the means (such as a blower or pump) being employed to force the fluid across the filter media. A surface filter, therefore, must have a large enough area of filter media to minimize the rate of increase in pressure drop across the filter media.

In order to increase the surface area in a surface-type filter cartridge, pleated filter media have been developed. Pleated surface-type filters typically include cellulosic or synthetic filter media which are relatively thin (about 0.005 inch to about 0.030 inch in thickness) and are folded in an accordion-like fashion to produce a plurality of pleats. Each pleat is typically made up of a pair of rectangular panels, with fold lines separating the panels, the pleats and fold lines of the pleated filter usually running vertically. To help insure that the surface of the panels remain apart, and to provide even more surface area, the pleated surface-type filter may also be formed from corrugated material and/or have a substantially non-filtering material located on each side of the medium to act as a support and drainage layer. Typically, pleated surface-type filter media are formed from calendered melt-blown material, cellulose and/or paper.

A pleated surface-type filter cartridge, as many other filter cartridges, typically includes a pair of end-caps. The end-caps of a pleated surface-type filter cartridge span the filter media, with the pleats and fold lines normally running from one end-cap to the other end-cap. If corrugations are present, such corrugations generally run at right angles to the pleat tips, that is, parallel to the end-caps. The end-caps serve to prevent the fluid which is desired to be filtered, from circumventing passage through the filter media by, in the case of pleated surface-type filter cartridges, coursing along the fold lines of the pleats and directly exiting through the ends of the cartridge. The end-caps may be solid throughout, or may include an opening therein. Filter cartridges having one solid end-cap and an end-cap having an opening therein are referred to in the art as single open end filter cartridges, while filter cartridges having two end-caps with an opening therein are referred to as double open end cartridges. Pleated surface-type filter cartridge end-caps are typically made form metal (steel, stainless steel etc.), but also have been fabricated from non-elastomeric thermoplastic (such as polypropylene, polyester and polysulfone) and thermoset (such as plastisol, urethane, silicone, epoxy) material.

Various methods have been proposed for attaching an end-cap to a filter cartridge. In general, these methods may be classified into four major categories: potting, molding, thermal-welding and spin-welding.

Potting entails pre-forming the end-cap, filling the end-cap with an adhesive and inserting the filter element therein. Potting may also be performed by placing the adhesive on the surface of the filter element and pressing the filter element against the end-cap until the joint is set (this technique is also referred to as "bonding"). The adhesive is cured using a combination of heat and/or time.

In molding, the end-cap is molded directly onto the end of a filter element. The molding material is typically a thermoset polymer, such as plastisol, urethane, silicone and epoxy. The molded end-cap is then removed from the mold.

In thermal welding, a thermoplastic end-cap is heated to liquefy one surface of the end-cap and form molten plastic.

One end of the filter element is then placed into the liquefied surface of the end-cap. When the end-cap solidifies once more, the filter element is securely joined to the end-cap.

In spin-welding, the end-cap and filter element are joined and placed in frictional contact with one another. Either the end-cap or filter element are then rotated with respect to the other so that heat is generated by frictional contact. The heat melts the surface of one or both to form a molten material at the interface of the two. When the rotation is stopped, the molten material solidifies to securely bond the end-cap to the filter element. Typically, one of the two members to be joined by spin welding is made of a thermoplastic resin. Spin-welding and thermal welding techniques are often referred to jointly as "heat bonding."

Application of end-caps to pleated surface-type filter elements are associated with problems not generally seen with other types of filter elements, such as depth-type filter elements. Pleated surface-type filter elements suffer from an inherent lack of structural rigidity as compared to many other types of filter elements, and in particular suffer from a tendency of the pleats to collapse and deform. Pleated surface-type filter elements are also more prone to leakage at the end-cap-filter element interface than more solid and integral filters such as fibrous depth filters. End-cap voids have also been associated with the potting, thermal welding and spin welding of end-caps to pleated surface-type filter elements. The latter may be due to non-uniform penetration of the potting or melted material by the pleated material and non-uniform spacing between pleats (some pleats being deformed to narrow the gap between them, others being more open) in particular when repositioning or withdrawal of the pleated filter element occurs.

Presently utilized end-cap constructions for pleated surface-type filters suffer from a number of drawbacks that limit the range of their possible applications and/or require less than desirable manufacturing expenditures to overcome such drawbacks.

Thermal and spin-welded end-caps of the prior art require the utilization of a separate gasket in order to seal the cartridge against the filter housing. A separate gasket in cartridge fabrication entails additional manufacturing expenses and the expenditure of labor. Further, as conventionally applied, such gaskets suffer from the tendency to fall off in transport, handling and installation into the filter housing—which can lead to the loss of seal integrity and bypass. Application of an adhesive to hold the gasket in place or heat-staking the gasket to the filter, is not commercially desirable as it adds another expensive manufacturing step. Chemical incompatibility problems and contamination from undesirable extractions may also adversely occur. Introduction of a mechanical interference fit, beside adding expense, requires that the parts be designed and produced with tight tolerances which is costly, and may be impractical. Application of end-caps to pleated filters which are melted on one surface by heat bonding techniques further suffers from the disadvantage that the pleats are prone to be deformed by the process, and air bubbles may be introduced as the pleat is seated in the molten material. Thus the ability to achieve a repeated integral seal on the filter cartridge is significantly adversely affected by use of such techniques to bond end-caps to the pleated filter elements. Incorporation of stainless steel and other metallic cores, which may be a component of the filter structure, is also made more difficult by use of such techniques, presumably because the melt depth is shallow and the adhesion is not strong enough to prevent the core from being pulled out of the cap.

End-caps of the prior art which are formed by molding, while in some cases not requiring a separate gasket component, suffer from the inherent composition and structure of the end-caps. Currently available end-caps for surface-type pleated filters often fail in strenuous conditions, in particular at prolonged exposures (more than about 4 hours) to high temperatures, particularly above about 80° C., and even at short term exposures (about 30 minutes) to high temperatures, particularly above about 120° C., in not providing the desired rigidity to keep the cartridge structure together along with provision of an adequate seal between the end-cap and the filter housing. Further, many of the materials used in molding conventional end-caps are not suitable for use in food. or pharmaceutical-type regulated applications. Using presently employed materials, fabrication of capped pleated filter elements by this technique further provides an unacceptable number of capped pleated filters having a low bubble point integrity leading to inadequate filtration. Such a technique further is associated with damage occurring in the pleated media near the end-cap due to the necessary force/movement applied to overcome sticking of the molded material to the mold in which it is sitting.

Currently available potted end-caps found on pleated surface-type filters also suffer from several drawbacks. First, such potted end-caps are made typically from metal, often stainless steel, or from materials such as polypropylene, polyester, polysulfone. Such materials lack the flexibility required to act as a seal with the filter housing, and therefore such potted end-caps require a separate gasket to be applied thereto to effectively seal the filter with the filter housing. Further, the adhesives used to join the end-caps to the filter element often fail when exposed to high temperatures. While not wishing to be bound by any theory, the present inventors hypothesize that the cracking of the adhesive under high temperatures, in particular when exposed to temperatures above about 120° C., may be due to the wide differential between the coefficient of thermal expansion of the adhesives used in such potting technique and the material comprising the end-cap Cracking of the adhesive leads to a loss of filter integrity as adjudged by the bubble point method. Cracking may occur during the exposure to high temperatures or may occur during cooling from such temperatures. While somewhat reducing cracking, even adding the costly step of blasting the cap to promote adhesion or the use of mold releasing agents to permit more ready movement of the adhesive in portions of end-cap-filter interface, does not entirely resolve this problem.

There is a need, therefore, for a method of fabricating and applying an end-cap to a pleated surface-type filter element which results in an improved seal between the pleated filter element and the end-cap over a wider range of temperatures and/or pressures then presently permitted by existing end-capped pleated filter elements, and which permits the end-cap to coact with the filter housing without need for a separate gasket element.

SUMMARY OF THE INVENTION

The present invention provides an improved end-cap method and system for sealing pleated surface-type filter elements over that available in the prior art.

One embodiment of the present invention includes an method for producing a pleated surface-type filter element sealed on one or more ends of the element, comprising the steps of: a) forming an end-cap structure from an elastomeric material; b) applying an adhesive polymer to at least one surface of the pre-formed end-cap structure; c) applying the adhesive-bearing end-cap to a pleated surface-type filter element in a manner to fuse the end-cap to the pleated surface-type filter element without substantially deforming the pleats of the pleated surface-type filter element; d) causing the polymeric adhesive to solidify and to bond the portion of the pleated surface-type filter element elastomeric end-cap structure to which it is in contact.

Still another aspect of the present invention includes a method of manufacturing filter elements for coaction with a filter housing, wherein the filter housing has a sealing edge portion(s) adapted for coacting with said filter element, comprising: a) forming a pleated surface-type filtering element having a top end and a bottom end; b) forming one or two end-cap(s) having an upper surface and a lower surface from an elastomeric polymer, said end-cap(s) for sealing the end of the filtering structure and coacting with the sealing edge portion(s) of the filter housing; c) applying adhesive to one surface of the elastomeric end-cap(s); d) contacting the adhesive surface of the elastomeric end-cap(s) to one or both ends of the pleated surface-type filtering structure; wherein the non-adhered surface of the elastomeric end-cap is of such dimension and shape that when coacted into the sealing edge portion(s) of the filter housing, an effective seal is formed between the filter housing and the pleated surface-type filter element.

Yet another aspect of the present invention includes a method of assembly of a filter element in a filter housing having a sealing edge portion adapted for coaction with a filter element comprising the steps of: a) obtaining a pleated surface-type filter element having one or more ends of the element sealed by an elastomeric end-cap and coupled to the end-cap through a polymeric adhesive; b) inserting the end-capped pleated surface-type filter element of step a into the filter housing such that the end-cap is coacts with the sealing edge portion of the filter housing and forms an effective seal between the filter housing and the filter element.

Another aspect of the present invention is a method for sealing a pleated surface-type filter cartridge comprising one or more layers of thin-walled pleated filter media supported on a relatively rigid core and sealed from the edges of the core to the outer perimeter of the thin-walled filter media by an end-cap formed of elastomeric material, comprising the steps of: a) filling the elastomeric end-cap with an operative amount of adhesive; b) inserting the pleated filter media edges into said adhesive whereby the edges of the filter material are sealed thereby.

And yet another aspect of the present invention is a filter element comprising: a) one or more, preferably two, elastomeric end-caps; b) thin-walled pleated filter medium having edges thereon constructed and arranged for positioning proximate said elastomeric end-caps; c) polymeric adhesive material within said end-caps for sealing the edges of the filter media therein.

Other advantages of the invention will be apparent from the following description, the accompanying drawings and the appended claims.

DETAILED DESCRIPTION OF THE INVENTION

Figure 1:
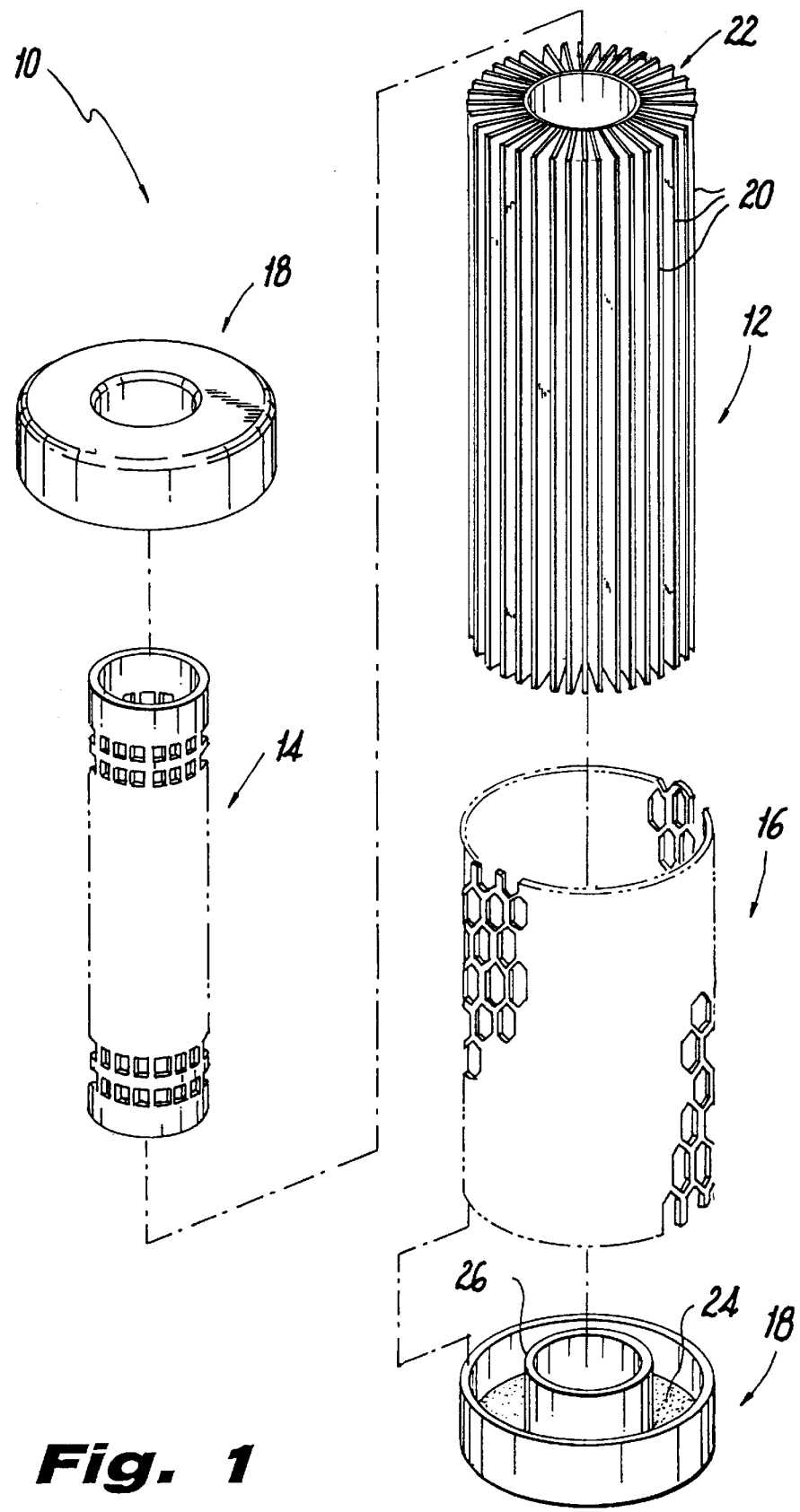
FIG. 1 is a side perspective elevational view of the assembly of a representative filter embodiment of the present invention.

The present invention overcomes many of the prior art problems associated with end-capping pleated surface-type filters. After considerable experimentation, with numerous end-cap material compositions and bonding techniques, and combinations thereof, the present inventors have found that pleated surface-type filters when end-capped with an elastomeric material adjoined to the pleated filter by means of a polymeric adhesive, in particular a thermoset or thermoplastic adhesive, provide a end-capped pleated surface-type filter having consistently overall superior filter-end sealing and exceptional resistence to high temperature fluid/pressure. Such end-caps provide a major benefit in that they can be dimensioned and shaped so as to both seal the pleated filter element and act as a gasket to provide effective sealing between the filter element and the filter housing. Such a design assures that the gasket will not come off during handling of the filter, a problem not un-commonplace with conventional pleated surface-type filter cartridges. Further, because of the novel construct and method of adherence of the end-cap to the pleated filter medium, metal and polymeric cores may be more easily bond and held in place in the end-cap. The resulting capped filter structure provides a filter which can be used in more demanding and/or regulated applications without increasing the number of assembly operations.

Adherence of the elastomeric end-cap to thin-walled pleated surface-type filter media was found to be greatly improved by interface with an adhesive rather than by insertion of the pleated filter material directly into a surface layer melt of the end-cap, as by means of thermal-welding or spin-welding. Attempts at bonding thin-walled pleated surface-type filter media through an elastomeric melt frequently resulted in end-capped filters eliciting distorted and deformed pleats, defective sealing between the pleat surface and the end-cap melt, and/or less than desired adherence between the end-cap and pleats. Further, it was found difficult to cause uniform melting of the surface of many elastomers, the surface often degrading and/or discoloring upon application of heat. Similar problems due to the heated melt may result when attempting to mold directly onto the filter element. Distortion of the pleats using direct molding, however, may be further exacerbated by sticking of the elastomer to the mold when the filter element is removed from the mold. While not wishing to be bound by any theory, distortion of the pleats, and the less than advantageous sealing between the pleat surface and the end-cap that was seen, may be due to the viscous nature of melted elastomer material which is hypothesized to more poorly flow around and about the pleats and provide more resistance to any movement, such as when the pleated thin-walled filter media is inserted into the melt or re-positioned in the melt. Further, owing to the chemical nature of such materials, it may be hypothesized that solidification of these materials, as opposed to solidification of non-elastomeric materials which were used in the prior art to fabricate end-cap media, may result in greater torsional forces being applied to the surface of the pleats.

By "elastomeric material" it is meant any polymeric material, such as a synthetic rubber or plastic, which at room temperature may be stretched to at least twice its original length and, upon immediate release of the stress, return with the force to its approximate original length. It is preferred that the elastomeric material used in fabricating the end-caps of the present invention be thermoset in nature, such as ethylenepropylene-diene-monomer (EPDM) or nitrile rubber, but thermoplastic elastomers such as a EPDM/polypropylene blend (e.g., Santoprene®) may be employed. By "thermoset" it is meant a substance comprised of a network polymer which hardens rather than softens upon heating. The hardening is typically due to the addition of new cross-links in the polymeric network. By "thermoplastic" it is meant a substance comprised of polymers which are softenable under heat and pressure and capable of re-softening. By "thermoplastic elastomer" it is meant a polymer that can be processed as a thermoplastic material, but also possesses the properties of a conventional thermoset rubber. It is preferred that the elastomer hardness be in the range of 50–75 durometer shore A.

Advantageously the elastomeric end-cap of the present invention is bound to the pleated surface-type filter element through an adhesive. By "adhesive" it is meant any material which can bind two or more elements which are desired to be bound together. Advantageously, the adhesive of the present invention is polymeric in nature. By "polymeric," it is meant that the material is macromolecules of multiple repeating molecular units. Preferably, the polymeric adhesive is a thermoset. or thermoplastic adhesive. Preferred thermoplastic a include polyester, nylon and polypropylene. Preferred thermoset adhesives include the epoxy resins and furanes. Preferably the viscosity of the adhesive, when the filter element is inserted therein, should range from about 1 cP to about $5\times10^6$ cP, more preferably from about 1 cP to about $5\times10^5$ cP, and yet more preferably from about 1 cP to about $5\times10^4$ cP. Preferred adhesives, found to bind well to most elastomers, as well as to provide minimal deformation of the pleats, include the group consisting of polyester, nylon, polypropylene, urethane, acrylonitrile rubber, epoxy resin, polybutene rubber, styrene rubber, polyvinylacetal, polyvinylidene copolymer, chlorinated rubber, polyester unsaturated, phenolic resins, furane resin and alkyd, and mixtures thereof By "pleated surface-type filter" it is meant a filter for removing suspended elements from a fluid suspension which works predominantly by surface-type filtration and comprises one or more thin-walled sheets (about 0.005 inch to about 0.030 inch in thickness) of filter media folded in an accordion-like fashion to produce a plurality of pleats. The filter media preferably comprises a calendered melt blown material, cellulose or paper, and is generally non-woven in construct.

Referring now to the drawings, wherein like reference numerals identify similar structural elements of the subject invention, and which set forth representative embodiments of the present invention, additional advantages of the present invention become readily apparent.

Referring to FIG. 1, there is shown FIG. 1 is a side perspective elevational view of the assembly of a representative filter embodiment, generally indicated by 10, of the present invention. Thin-walled pleated filter medium 12 is joined so as to form a sleeve. The thin-walled pleated filter medium 12 is preferably constructed as an annular sleeve, as shown, but can be formed in other geometric configurations according to the particular filtering application. Preferably, the pleats 20 are angled relative to lines substantially perpendicular to the outer perimeter of the medium 22. The sleeve of thin-walled pleated filter medium 12 generally surrounds a perforated core 14 which acts as a through duct for fluid passage. Conventionally, the sleeve of thin-walled pleated filter medium 12 is retained at its outer perimeter 22 by a filter medium netting 16. Thin-walled pleated filter medium 12 is capped with upper and lower end-cap (18) which seal the ends of thin-walled pleated filter medium 12 and act as a gasket for sealing with a filter housing (not shown).

Figure 2:
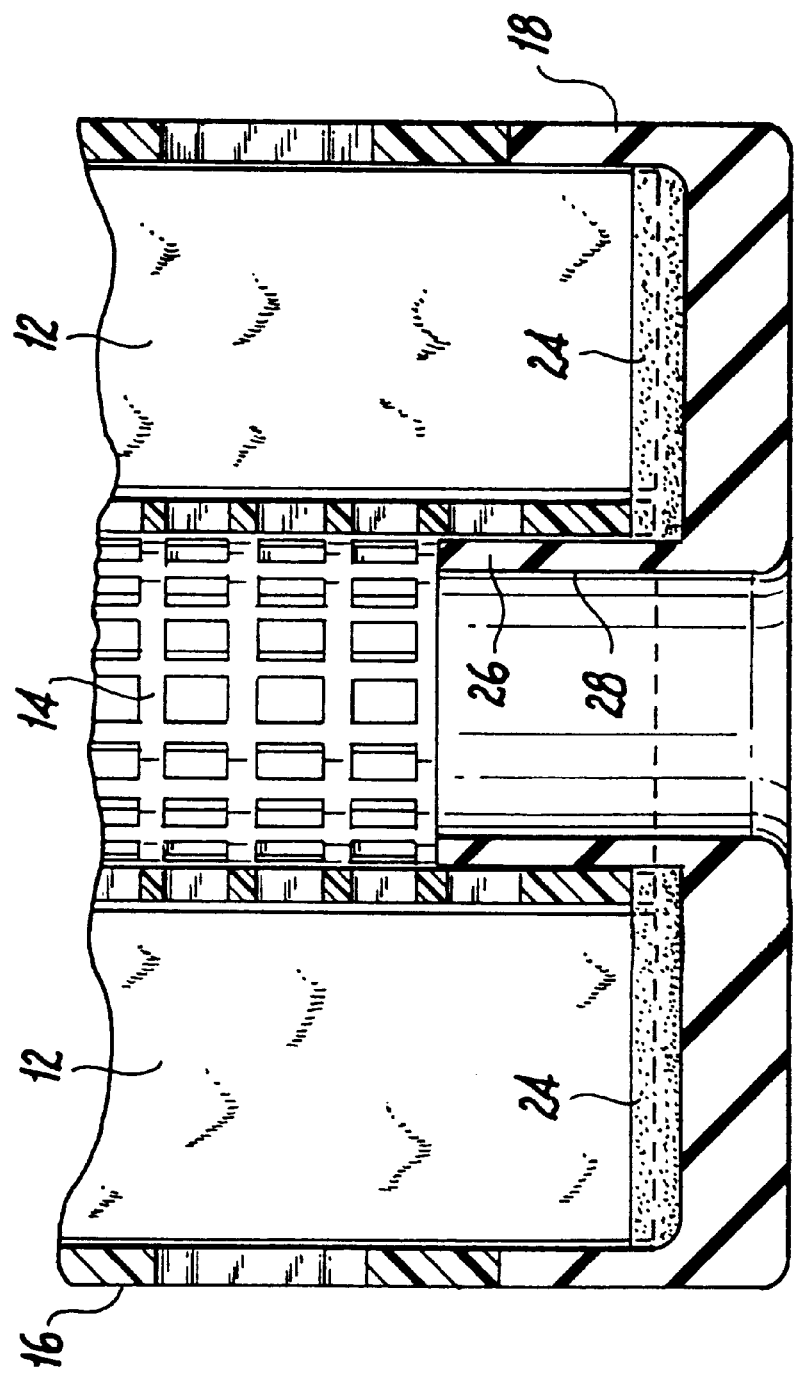
FIG. 2 is a side elevational cross-sectional view of the lower-half of the representative filter sheet embodiment of FIG. 1 cut along a median line.

Now referring to FIG. 2, there is shown a side elevational cross-sectional view of the lower half of the representative filter embodiment of FIG. 1 cut along a median line through the lower end-cap 18. Thin-walled pleated filter medium 12 is shown to be embedded in adhesive layer 24 residing in end-cap well 28 positioned within end-cap 18. Perforated core 14 may be positioned over a medial end-cap aperture portion 26 which centers perforated core 14 within the sleeve of thin-walled pleated filter medium 12. Surrounding thin-walled pleated filter medium 12 is filter medium netting 16.

While the invention has been described with respect to preferred embodiments, those skilled in the art will readily appreciate that various changes and/or modifications can be made to the invention without departing from the spirit or scope of

What is claimed is:

1. A method for producing a pleated filter element for co-action with a filter housing having a sealing edge portion adapted for co-action with said pleated filter element, said method comprising the steps:

a) selecting a first and second end-cap having a hardness in the range of about 50 to about 75 durometer Shore A, each of said end-caps having an inner diameter flange and an outer diameter flange with an annular space defined there-between, and each of said end-caps being dimensioned so as to permit sealing co-act along the outer surface of the outer diameter flange with said filter housing, said end-caps comprising a material selected from the group consisting of: ethylene-propylene diene monomer and nitrile rubber.

b) selecting a pleated filter element having a top surface and a bottom surface, said pleated filter element fabricated from thin sheet material comprising glass paper having a thickness of about 0.005 to about 0.030 inches and dimensioned such that the top surface within the annular space of said first end-cap and said bottom surface of the pleated filter element fits within either said annular space of said second end-cap;

c) filling a portion of said annular spaces of said first and second end-cap to a substantially uniform depth with a solid-setting liquid polymeric adhesive material which has a viscosity of about 1 cP to about $5\times10^4$ cP in its non-set liquid state, said liquid polymeric adhesive comprising a thermoset adhesive;

d) inserting said top surface of said pleated filter element into said filled annular space of said first end-cap and said bottom surface of said filter element into the filled annular space of said second end-cap while said solid-setting liquid polymeric adhesive material is in its non-set state; and comprising a thermoset adhesive;

e) allowing said solid-setting liquid polymeric adhesive material to set.

2. The method of claim 1 wherein upon setting of the solid-setting liquid polymeric adhesive material in step (e) a seal is effectuated between the mounted portion of said top portion and said bottom portion of said pleated filter element and said elastomeric caps which is capable of withstanding temperatures of 120° C. for about 30 minutes and 80° C. for more than 4 hours without loss of filter integrity as adjudged by the bubble point method.

3. The method of claim 1 wherein the thermoset adhesive is selected from the group consisting of: epoxy resins and furane.

4. The method of claim 1 wherein the elastomeric end-caps comprise an ethylene-propylene diene monomer and polypropylene.

* * * * *